United States Patent [19]
Gaber et al.

[11] Patent Number: 5,303,640
[45] Date of Patent: Apr. 19, 1994

[54] FOOD PRESS

[75] Inventors: Ira Gaber, West Norwalk, Conn.; Cooper C. Woodring, Topeka, Kans.

[73] Assignee: Better Mousetraps, Inc., West Norwalk, Conn.

[21] Appl. No.: 975,762

[22] Filed: Nov. 13, 1992

Related U.S. Application Data

[63] Continuation-in-part of Ser. No. 763,434, Sep. 20, 1991.

[51] Int. Cl.⁵ .................... A47J 19/06; A47J 42/34; B30B 7/00; B30B 9/02

[52] U.S. Cl. .................................. 99/495; 99/458; 100/112; 100/125; 100/234; 100/902

[58] Field of Search .............. 99/495, 509, 510, 456, 99/458, 460, 465; 100/125, 132, 233, 234, 112, 116, 902; 241/95; D7/665, 666

[56] References Cited

U.S. PATENT DOCUMENTS

| | | |
|---|---|---|
| D. 266,824 | 11/1982 | Harris . |
| D. 273,553 | 4/1984 | Bovet . |
| D. 288,272 | 2/1987 | Steinko . |
| D. 293,757 | 1/1988 | Pedrini . |
| D. 298,720 | 11/1988 | Bolduc et al. . |
| 3,702 | 11/1869 | Littlefield . |
| 207,974 | 9/1878 | McConnell . |
| 254,382 | 2/1882 | Rockwood . |
| 427,604 | 5/1890 | McKay . |
| 531,478 | 12/1894 | Stauber . |
| 643,443 | 2/1900 | Aiken . |
| 1,088,123 | 2/1914 | Browning . |
| 1,197,231 | 9/1916 | Petrik . |
| 2,046,396 | 7/1936 | Matter et al. . |
| 2,427,446 | 9/1947 | De La Roza, Sr. . |
| 2,589,724 | 3/1952 | Miller . |
| 2,776,616 | 1/1957 | Sarossy . |
| 3,223,133 | 12/1965 | Brookey . |
| 3,550,775 | 12/1970 | Cooley . |
| 3,580,168 | 5/1971 | Zysset . |
| 4,069,752 | 1/1978 | Ahner . |
| 4,188,875 | 2/1980 | Fabbri et al. . |
| 4,301,722 | 11/1981 | Balbo et al. . |
| 4,348,950 | 9/1982 | Harris . |
| 4,393,588 | 7/1983 | Kowalski . |
| 4,394,834 | 7/1983 | Lowe . |
| 4,466,346 | 8/1984 | Gemelli . |
| 4,537,123 | 8/1985 | Holcomb . |
| 4,545,299 | 10/1985 | Ahner . |
| 4,582,265 | 4/1986 | Petronelli . |
| 4,590,000 | 5/1986 | Baatz et al. . |
| 4,714,205 | 12/1987 | Steinko . |
| 4,787,307 | 11/1988 | Rolband . |
| 4,794,854 | 1/1989 | Swaim . |

FOREIGN PATENT DOCUMENTS

| | | |
|---|---|---|
| 0134093 | 3/1985 | European Pat. Off. . |
| 0212057 | 4/1986 | European Pat. Off. . |
| 3113515 | 11/1982 | Fed. Rep. of Germany . |
| 1052074 | 1/1954 | France . |
| 1111677 | 3/1956 | France . |
| 429725 | 2/1948 | Italy . |
| 167888 | 3/1934 | Switzerland . |
| 2084862A | 4/1982 | United Kingdom . |

*Primary Examiner*—Timothy F. Simone
*Attorney, Agent, or Firm*—George P. Hoare, Jr.

[57] ABSTRACT

A food press having an elongated body including a forward end to which a perforated cap or the like is removably attached and through which pressed foodstuffs pass, and a chamber means within the body adjacent the forward end of the press for receiving and pressing foodstuffs. A reciprocating piston is slidably fitted within the chamber means for moving and pressing foodstuffs, wherein the piston is adapted to be positioned rearwardly of the foodstuffs in the chamber means in its retracted position and against said forward end for pressing the foodstuffs through the perforations in the cap in its forward position. The press also has a rotatable handle pivotally connected to the elongated body rearwardly of the piston, and a linking member connected to the handle and to the piston. When the handle is rotated in one direction the piston is moved to it's retracted position to allow the chamber means to received foodstuffs. When the handle is rotated in the other direction the piston is moved to it's forward position for pressing foodstuffs through the perforations in the cap. The food press provides progressively increasing pressure ratios through the linking of the non-constant increments of linear movement of the travel of the piston to the constant increments of arcuate travel of the handle.

18 Claims, 6 Drawing Sheets

FOOD PRESS

RELATED APPLICATION

This application is a continuation-in-part application of Ser. No. 763,434, filed Sep. 20, 1991 the entire disclosure of which is incorporated herein by reference.

FIELD OF THE INVENTION

This invention relates to a food press for pressing, mashing, and/or crushing foodstuffs, such as fruits, vegetables, herbs, spices, and like condiments. Pressed foodstuffs become finely divided and/or separated and may be consumed directly after pressing or may be added as an ingredient during a food preparation procedure. In particular, this invention relates to an improved garlic (allium sativum) press which can be used for kitchen, domestic and commercial purposes. Specifically, this invention relates to a food press which includes a removable and/or interchangeable perforated member through which the food is pressed.

BACKGROUND OF THE INVENTION

United States patent application Ser. No. 763,434, filed Sep. 20, 1991 of applicants discloses a food press including a body having perforations through which pressed foodstuffs can pass and a chamber within the body and adjacent to the perforations for receiving and pressing foodstuffs, such as garlic, therethrough. A piston, slidable within the chamber, is provided for moving and pressing foodstuffs as the piston moves in a linear direction into and through the chamber. A rotatable handle is connected to the body of the food press and a linking member is connected to the handle and to the piston. In operation, when the handle is rotated in one direction the piston is linearly moved within the body for loading the press and when the handle is rotated in the other direction the piston is linearly moved in the body for pressing foodstuffs therethrough. The press disclosed in our co-pending application has relatively high mechanical advantage ratios and pressures in crushing foodstuffs. With the press of the invention of our co-pending application, essentially constant pressure on the handle produces substantially increasing piston pressures to meaningfully improve the processing of foodstuffs. The press of the invention of our co-pending application also possesses increased capacity for pressing virgin foodstuffs while being sized for convenient use and storage.

The present invention also relates to a food press which is well suited for pressing foodstuffs, such as garlic.

SUMMARY OF THE INVENTION

The food press of the present invention includes the described food press of our co-pending application and provides ease of cleaning and ease of manufacture.

The food press of the present invention comprises a member removably secured to the food press which includes the perforations through which the food is pressed. After use the removability of the member facilitates cleaning of foodstuffs from the press and specifically from in and about the perforations.

In addition, the food press of the present invention can include a number of removable members having a variety of different perforations or openings through which the foodstuffs can be pressed. The food press of the present invention with its removable and interchangeable members, such as caps, provide consumers with choices in the sizes of pressed foodstuffs as each cap will offer alternate numbers of and sizes of openings or perforations and facilitates more complete ability to clean the interior parts of the device as removal of the cap will expose the forward portion of the piston when the piston is in its forward most position, as well as allow easier access to the interior of the perforated wall since the depth of this interior wall will be more easily accessed by a finger, brush or soapy water.

Furthermore, the present invention also can facilitate the manufacture of the food press by its removable member, such as a removable cap. The piston preferably has very tight tolerances with the interior breadth of the body of the press to prevent "blow-back" of relatively solid foodstuffs and to prevent liquified foodstuffs from sliding backward between the piston and the interior diameter of the body instead of being forced only forward and out the perforations as desired. This preferred tight tolerance suggests that at least the front portion of the body's interior breadth that the piston moves within has little or no draft angle. This requirement increases the cost of manufacture of the body of the press in tooling and of body components. The removable and separate perforated cap or the like of the present invention, however, obviates these drawbacks by substantively limiting the zero or near zero draft area to the interior breadth of the removable and separate caps instead of the interior breadth of the body. In addition, the manufacture of the body of the press is facilitated with a separate perforated member because it can be readily molded with increased draft generally as a tube or the like with openings at both ends and with means thereon or therein for removably securing the perforated member to the press.

In a preferred embodiment of the invention, the food press comprises an elongated tubular or cylindrical body having a forward end with a removable cap thereon, such as a cap, which includes perforations through which pressed foodstuffs can pass. The member or cap includes a front wall with the perforations therethrough and a depending wall or skirt. The body of the press houses or includes a crushing chamber at the forward end, and a loading chamber adjacent to the crushing chamber having an opening therein for receiving foodstuffs. Coacting means on the depending wall of the member and on the forward end of the body releasably secure the member and body together. A piston, slidably fitted within the chambers, reciprocates therein for moving and pressing the foodstuffs. The piston is adapted to be positioned in the body of the press rearwardly of the foodstuffs when they are fed into the loading chamber and as the piston advances the foodstuffs into the crushing chamber of the press by the piston, and the piston is adapted to be positioned against the inner wall of the cap at the forward end when it has been advanced through the crushing chamber for pressing the foodstuffs through the perforations in the cap. In the preferred embodiment, the cap includes at least that portion of the crushing chamber adjacent the perforations. A rotatable handle pivotally connected to the body rearwardly of the piston and a linking member connected to the handle and to the piston linearly advances and retracts the piston in the body of the press as the handle is rotated. When the handle is rotated in one direction, the piston is adapted to move to its retracted position in the body to allow the press to receive foodstuffs in the loading chamber. When the handle is rotated in the other direction the piston is adapted to be advanced to its forward position in the crushing chamber for pressing foodstuffs through the perforations of the removable cap.

In this preferred embodiment, the food press of the present invention can include one or more threaded screw caps having different opening patterns in their forward end or front wall and having a screw threaded section in their reduced exterior diameter proximate their rearward end or that end which engages a threaded end of the forward portion of the body. The screw threads on the caps preferably are on the cap's rearward exterior diameter and are reduced in diameter such that when the screw threads engage the interior diameter screw threads of the forward portion of the body, the two parts interior and exterior diameters can remain similar and the screw threads of both parts can be completely contained between the interior and exterior diameters of both parts. This means of engagement between the two parts keeps the threads clean from intrusion of any foodstuffs, makes obvious to the consumer how the parts assemble, and provides that the considerable pressure build-up which occurs within during the pressing process will force the male screw threads on the cap to expand or exert additional outward forces against the female screw threads within the body.

The mating of the two screw threaded parts also keeps the point of contact of their interior most diameters flush one with the other such that the tight tolerance piston sliding within the interior diameter will not have its progress interrupted by any step or change in diameter. The zero draft or very tight tolerance area preferably is included in the depending wall of the cap as its length is such that it occupies a majority of the crushing portion within the forward portion of the body. The screw threaded cap extends into the body to a point just short of the opening which can be provided in the body and which can define the forward end of a loading chamber in the body while the cap occupies most of the crushing portion within the crushing chamber.

The exterior breadths or diameters of the two parts (cap and body) can be similar, however, the removable cap part can have exterior texturing and/or color change, or other indicia, to facilitate the obviousness and physical requirements of rotatably removing it from the more stationary base part. Keeping the exterior diameters of both parts similar also allows the entire device to be used in a hand-held manner or to continue to be used as a table or counter surface operated device by providing a flat surface contact that exists during the device's complete operating cycle between the bottom most line on the device's cylindrical body and the flat surface. Preferably, the handle of the device is configured in such a way that at any point of rotation of the handle, the handle's lowest most points are always in contact with the flat surface thus assuring a stable footing for the press to be conveniently operated and to prevent the press from rocking side to side.

When the cap is removed from the body and the piston is in it's forward most position, about one-half of the piston preferably will extend out the forward extreme of the body. This allows the forward portion of the piston to be cleaned but restricts the piston from being severely tilted within the body as approximately one-half of the piston's length is still being supported within the somewhat larger threaded interior diameter of the body and the rearward most edge of the piston is still rearward of the rearward most threaded portion of the body or still being supported within the relatively tight tolerance interior diameter area of the body. Additionally, the cap or caps can be removed and/or replaced regardless of the position of the piston within the base of the device, however, it generally is easier to engage a cap with the body when the piston is partially or fully retracted as the cap's tight tolerance interior diameter does not have to clear the piston's tolerance exterior diameter until the cap is fully threaded into the base and proper alignment is thereby assured. For this to occur, the handle of the food press, illustratively, is at about a 45 degree or greater angle to assure that the piston is retracted enough within the body so as not to come into contact with the rearward most edge of the cap while the cap is being threaded into the base.

The several interchangeable caps in the preferred embodiment have identical screw threads so that each cap mates with the same screw thread body, however, each alternate cap will have different perforated patterns in the forward end perforated wall for excising the foodstuffs in a variety of sizes and shapes. The percentage of perforated or open area of each cap can have approximately similar to keep the pressure required to force foodstuffs out the openings roughly the same from cap to cap.

The different caps of the invention preferably thread into the body identically and each cap has its threaded rotation ceased by the meeting of the extreme rearward vertical material thickness of the caps with the intersection within the body of its interior diameter and its enlarged diameter threaded portion where a circumferential vertical wall or step is created. Additionally, as each cap has a second vertical circumferential material thickness at the point of intersection between the cap's exterior diameter and the cap's reduced diameter threaded portion, this second circumferential vertical wall or step will also cease the cap's rotation when it contacts the forward extreme material thickness of the base. The contacting of these two pairs of surfaces as the two parts being threaded together will assure that any vertical or horizontal alignment that may exist in the perforated patterns will remain in vertical or horizontal alignment. This alignment is desired for visual reasons and should a slight deviation occur from over tightening the threads, it would not have an adverse effect on the device's performance.

In a preferred embodiment, the male threaded area of the caps and the female threaded area of the forward portion of the interior of the base both have adequate length to accommodate, typically, three complete revolutions of threads. In this diameter part, this amount of threaded surface contact assures that there is sufficient area of engagement to prevent the interior pressures that can exceed 180 pounds per square inch, from forcing the threaded cap off of the base, while maintaining a simple and quick release mechanism for the consumer.

The presses of the invention also can incorporate only one cap such that the ease of cleaning and efficiency of manufacturing are addressed and achieved.

Other embodiments of the invention provide consumers with choices of sizes and shapes of excised foodstuffs. In these embodiments, several alternate caps may be incorporated. Some may have varying sizes and numbers of traditional round openings, while others may have openings in shapes other than round such as square, rectangle, triangular, or other basic geometric but irregular shaped openings. Additionally, the openings may have parallel walls as they pass completely through the material thickness of the cap's forward most wall, or the openings may taper inward or outward such that the opening's shape is larger on one surface of the cap's wall than on the surface of the cap's other wall. The openings junction with either of the cap's wall surfaces may be sharp or may be softened or radiused to allow the liquified foodstuff's entry or exit into or out of the opening to be made easier.

The present invention, moreover, includes a multi-pronged device that include prongs configured to align with the cap's openings such that the multi-pronged device can engage each opening in the cap simultaneously thus providing additional means of cleaning of the openings of the caps or the like. The prongs on this device will correspond to the shape, pattern and location of the openings in the caps, but each prong may be of a slightly smaller size than its corresponding opening and the prong's length may be longer than the depth of the opening.

Additionally, the multi-pronged device may have it's prongs of varying length such that a certain prong or certain prongs, for example at the center, engage a specific opening or specific openings before the remaining prongs. The one or more prongs that have now engaged their respective openings will serve to guide the remaining prongs into their respective openings, to thereby facilitate the engagement of the entire pronged device.

In the use of the press of the invention the removable member, such as a cap, thereby facilitates cleaning of the perforated cap and the other components of the press, including the piston. At the same time the multi-pronged device facilitates in and about the perforated wall cleaning between and during complete cleaning cycles. Also the corresponding interior configurations of the removable member and the body facilitates mass production of the presses of the invention.

DETAILED DESCRIPTION OF A PREFERRED EMBODIMENT

Figure 1:
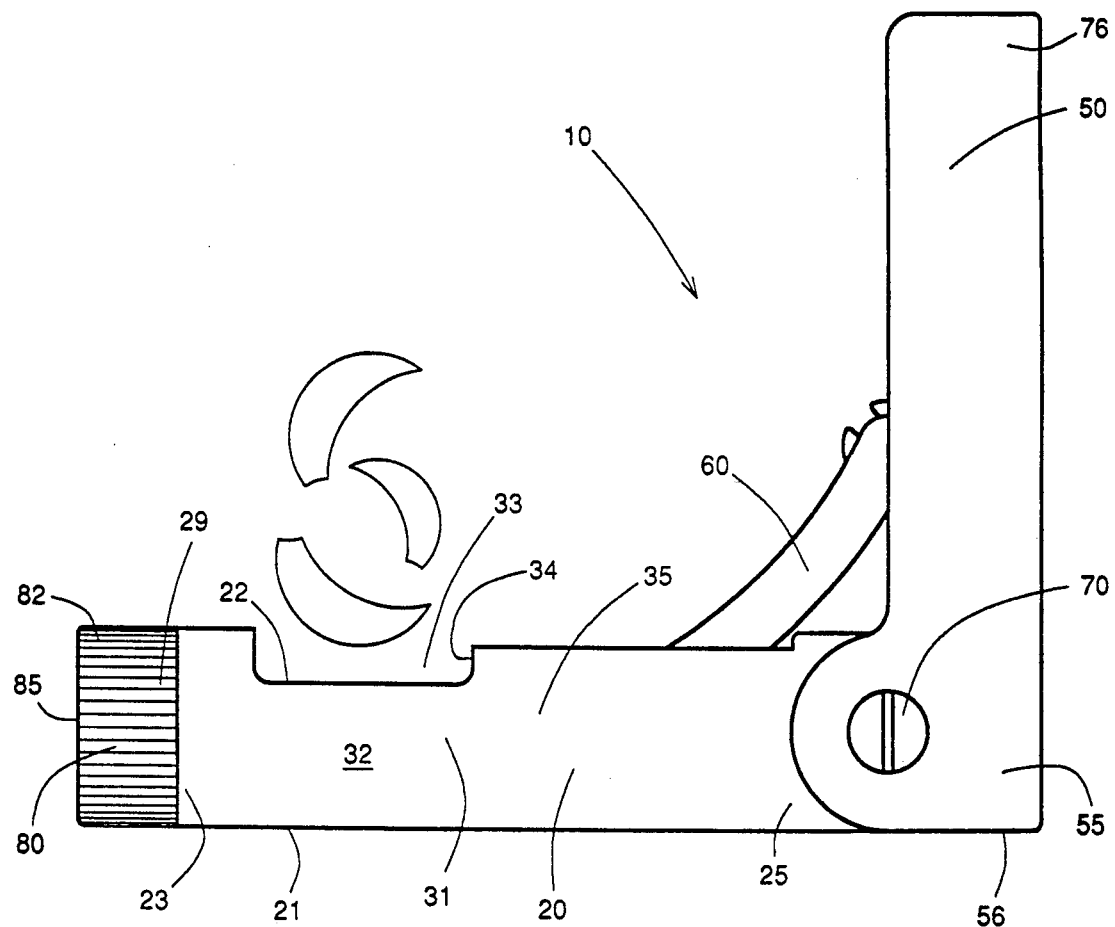
FIG. 1 is a side elevational view of a food press of the present invention shown in the open position ready to receive cloves of garlic.
Figure 2:
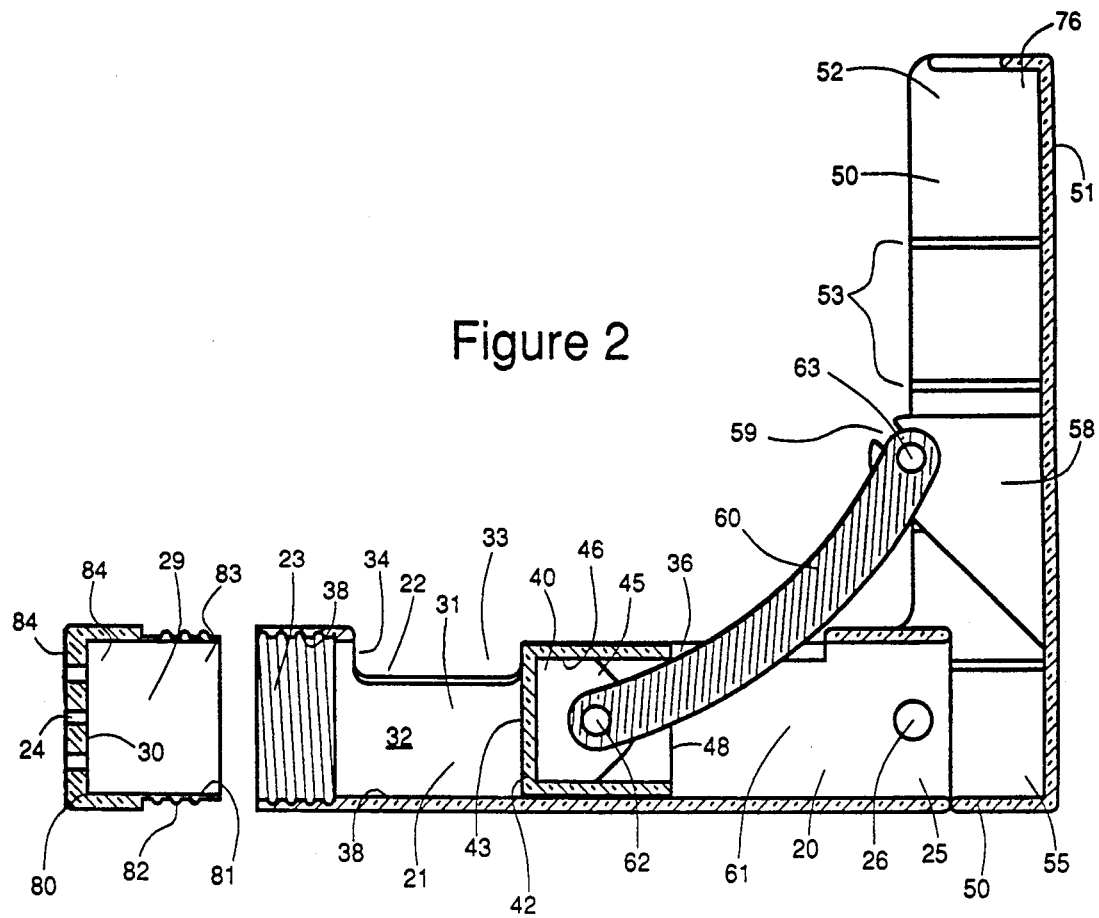
FIG. 2 is the same as FIG. 1, except that the food press is partly in section.
Figure 3:
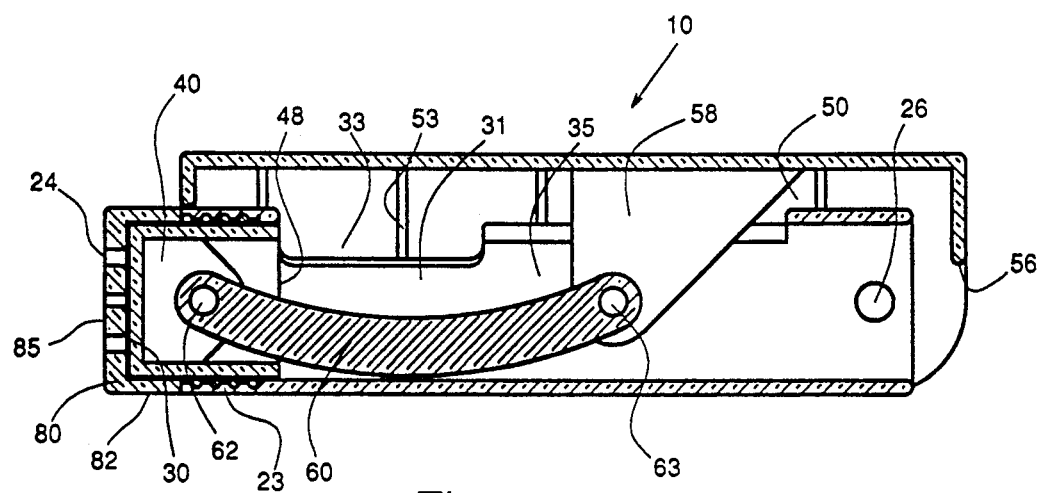
FIG. 3 is a side elevational view partially in section of the food press of FIG. 1 in the closed position.

Referring to the drawing and first to FIGS. 1-3 there is shown a hand-holdable garlic press 10 of the present invention including a base 20, a piston 40 within the base 20, a handle 50 pivotally connected to the base 20, a linking arm 60 pivotally connected to and between the piston 40 and the handle 50, a shaft 70 pivotally connecting the base 20 and the handle 50 at their pivot point, and a perforated cap 80 removable from the base 20.

The base 20 includes an elongated body 21 having a length which is substantially greater than its breadth. The body 21 preferably is cylindrical or tubular and hollow, and includes chamber means 22 for foodstuffs and for the piston 40. In the illustrative embodiment, the body 21 has a hollow cylindrical cross section defined by the peripheral wall 32.

The one or forward end 23 of the body 21 is open and terminates with a screw thread on the inner circumferential surface 38 for removably receiving the front cap 80 (see FIG. 2). The cap 80 has a plurality of perforations 24 therethrough for the passage of pressed foodstuffs. The handle 50 is pivotally mounted to the other or rear end 25 of the body 21 which is also open. As seen in FIGS. 2 and 3, the rear end 25 includes opposing bores 26 therethrough for pivotally connecting the handle 50 to the body 21. The structure of the end 25 allows the handle 50 to rotate and limits the rotation of the handle 50, as hereinafter described in more detail.

Extending through the wall 32 of the body 21 above the chamber 31 is an opening 33 for feeding or loading foodstuffs into the loading chamber 31. In the illustrative embodiment the opening 33 is rectangular in configuration and the wall 32 includes a cut-out portion to provide a trough 34 to facilitate loading.

Rearward of and contiguous with the loading chamber 31 is a piston chamber 35 for slidably positioning the piston 40 therein prior to pushing and pressing foodstuffs through the loading chamber 31 and into the crushing chamber 29.

The body 21 also includes an opening or a slot 16 in its top 37 for receiving the linking arm 60 connected to the piston 40 and the handle 50. In the illustrative embodiment, the slot 36 extends from the loading chamber opening 33 rearwardly to accommodate the configuration and rearward movement of the arm 60.

Adjacent the open forward end 23 and within the cap 80 is a crushing chamber 29 wherein the piston 40 presses, crushes, etc. foodstuffs against the inner surface 30 of the cap 80. At the crushing chamber 29, the peripheral wall 32 is closed about the chamber 29 so that foodstuffs exit through the perforations 24 and through the wall 85.

The perforated cap 80 has a rearward end 83 upon which the male threads lie and a forward end 84 which has a texture applied to the outer circumferential surface 82 to facilitate removal of the cap 80 by the operator's hands. The perforated front cap 80 interfaces with the female threads within the forward end 23 of the elongated body 21 of the base 20.

As shown, perforated cap 80 is rotatably removable from base 20 and in the preferred embodiment, cap 80 has male threads on its rearward 83 exterior circumferential surface 82. These threads lie on a reduced diameter surface such that when they engage similar diameter female threads within the forward end 23 of the base 20, both sets of threads are contained between the common interior and exterior walls of both cap 80 and base 20.

FIG. 2 shows the cap 80 removed from the base 20 and in this figure it can be seen that the two parts have corresponding and engaging threaded positions with the male threads being on the cap 80 and the female threads being in the base 20. The length of the surfaces of the two parts that contain the threaded portions is such that sufficient revolutions of threads can prevent the parts from separating under the considerable pressure that occurs during the pressing operation of the garlic press 10. It can be seen that the threads on both parts lie between the two parts exterior and interior walls with the raised portion of the threads being on the cap 80 and the portion of the threads being on the cap 80 and the depressed portion of the receiving threads being in the base 20.

The preferred front cap 80 has a zero or near zero draft angle within its interior diameter to maintain tight tolerances with the piston 40 as the piston 40 passes from the similar interior diameter of the forward end 23 of the base 20 into the perforated front cap 80. This zero or near zero interior diameter within the perforated front cap 80 allows the base 20 to have some rearward tapering draft angle within its interior diameter to facilitate ease of manufacturing of the base's 20 relatively long length from its somewhat smaller interior diameter open forward end 23 to its somewhat larger diameter interior open rearward end 25.

FIGS. 1-3 also show that the relatively short interior length of the cap 80 which constitutes the crushing chamber 29 can be more easily manufactured with a zero or near zero draft angle than can be the relatively long interior length of the base 20. The peripheral wall 32 of the base 20 can now have a reasonable draft angle to facilitate ease of manufacturing without any adverse effect on the very tight tolerance required between the piston 40 and the press 10 during that portion of the pressing cycle when the piston 40 begins to advance forward and pass from the loading chamber 31 in the base 20 into the crushing chamber 29 which is now located almost entirely within the perforated cap 80.

FIG. 3 shows the cap 80 completely engaged with the base 20. This fully assembled view of the cap 80 into the base 20 with the threads on both parts fully hidden from either interior or exterior exposure assures a smooth interior transition between the two parts for the piston 40 to slide within and a smooth exterior transition to facilitate cleaning. The circumferential exterior 82 of the front end 84 of the cap 80 may have small grooves or other surface texture to visually signal that it is a separate part and to assist rotating for removal by the fingers of the user.

FIG. 3 shows the piston 40 in its forward most position. In this position and with the perforated cap 80 fully threaded into the base 20, the piston 40 may contact the interior of the vertical wall 30 of the perforated cap 80. This contact or very tight tolerance assures that all of the foodstuffs are pressed through the openings in the perforated cap 80. The garlic press 10 may be configured such that the front surface of the piston may actually apply considerable pressure against the interior surface of the vertical wall 85 of the perforated cap 80 when the press 10 is fully closed and when the press 10 is empty of any foodstuffs. The contacting of these two part's surfaces with considerable pressure will compensate for any flexing or bending of any intermediate parts that would tend to reduce the pressure of the piston's 40 front surface against the surface of the interior wall 30 of the perforated cap 80.

FIGS. 1-3 also shows that the cap's 80 rear most edge of its threaded portion seats against the rear most edge of the threaded portion within the base 20 at a point that is still forward of the rearmost edge of the piston 40 when it is fully extended forward. This prevents the piston's 40 rear most edge from extending forward of the two part's interior intersection and prevents the piston 40 from possibly being prevented from smoothly sliding rearward should there be any small misalignment at the interior intersection between the two parts.

As best seen in FIG. 3, the piston 40 of the garlic press 10, when the press 10 is fully closed, extends forward to the limit of its travel within the base 20. At this furthest point of travel and where the cap 80 is removed, the piston 40 would extend its forward portion out of the open front of the base 20 such that it would be accessible for cleaning. The piston's 40 rear most diameter is still being supported by the non-threaded interior diameter 38 of the base 20 such that the piston 40 will not be caused to tip downwardly or to droop which would make the installation of the cap 80 more difficult with the piston 40 fully extended.

As illustrated in FIGS. 2 and 3 the piston 40 is cylindrical and corresponds to the cross sectional shape of the inner surface 38 of the body 21. The piston 40 is hollow and includes a cylindrical body 41 having a breadth or diameter slightly less than the breadth or diameter of the inner surface 38 of the body 21, to thereby provide a sliding fit therebetween.

In the preferred embodiment, the piston 40 is injection molded and made from self lubricating plastic materials.

The piston 40 is hollow with an open rear end 44. Spanning or extending the height of the interior surface 46 of the piston 40 are a pair of struts 45 (FIGS. 3 and 4) integral with the inner surface 46 of the cylindrical wall 41. The struts 45 include substantially horizontal notches 47 therein extending along the longitudinal axis of the piston 40 for connecting the piston 40 to the linking arm 60.

The piston 40 also includes a closed front wall 42 preferably having a flat frontal surface 43 which corresponds to the inner surface 30 of the flat perforated wall 85 of the cap 80 shown in FIG. 2.

The confining wall 32 of the body 21 limits or confines the piston 40 to linear reciprocating movement as the handle 50 rotates in an arcuate manner in counterclockwise and clockwise directions. At the same time, the space between the wall and the piston 40 is less than the area of any one perforation 24. As a result, when the piston 40 is crushing the foodstuffs, liquids and solids will flow or pass through the perforations 24 and not back about the piston 40.

Figure 4:
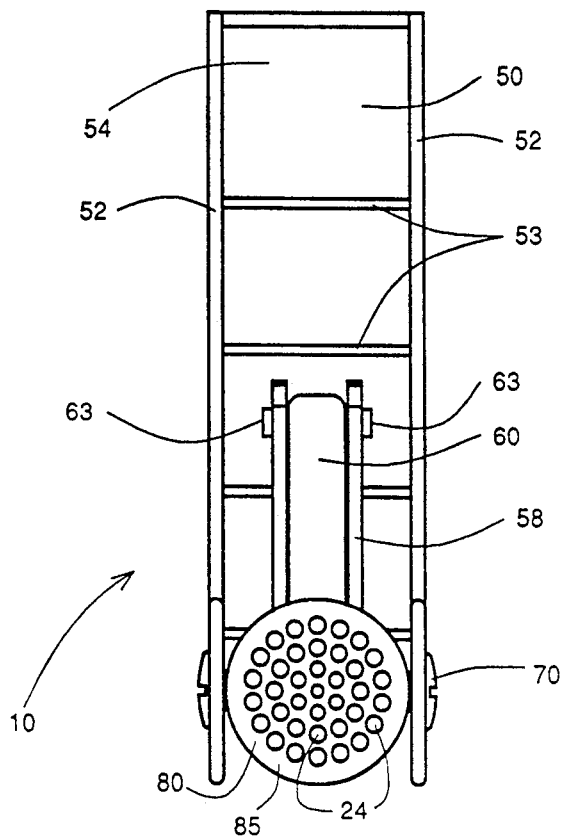
FIG. 4 is a front view of FIG. 1.
Figure 5:
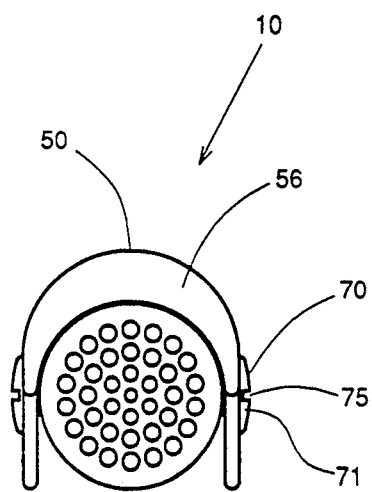
FIG. 5 is a front view of FIG. 3.

The handle 50 is rotatably attached to the exterior of the body 21 at the open rear end 25. The exterior of the handle 50 is rectangular, having a curved top surface 51 and depending side walls 52 (see FIGS. 5 and 6). Internally, the handle 50 includes a plurality of spaced apart lateral ribs 53 which extend across the handle 50 for providing strength. As shown in FIG. 4, the inner surface 54 of each rib 53 is curvilinear and corresponds to the cylindrical shape of the body 21 so that in its closed position the handle 50 overlies and can rest on the body 21.

As shown in FIGS. 2–4, within the handle 50, intermediate its ends are a pair of struts 58 which extend from the interior of top surface 51 to the bottom open portion of the handle 50. Each strut 58 includes a notch 59 therein at the open portion of the handle 50. As shown in FIG. 2, each notch 59 extends obliquely downwardly when the handle 50 is opened and each notch 59 is adapted to receive a tab 63 which snap-fits into a notch 59 for pivotally connecting the arm 60 to the handle 50.

Figure 6:
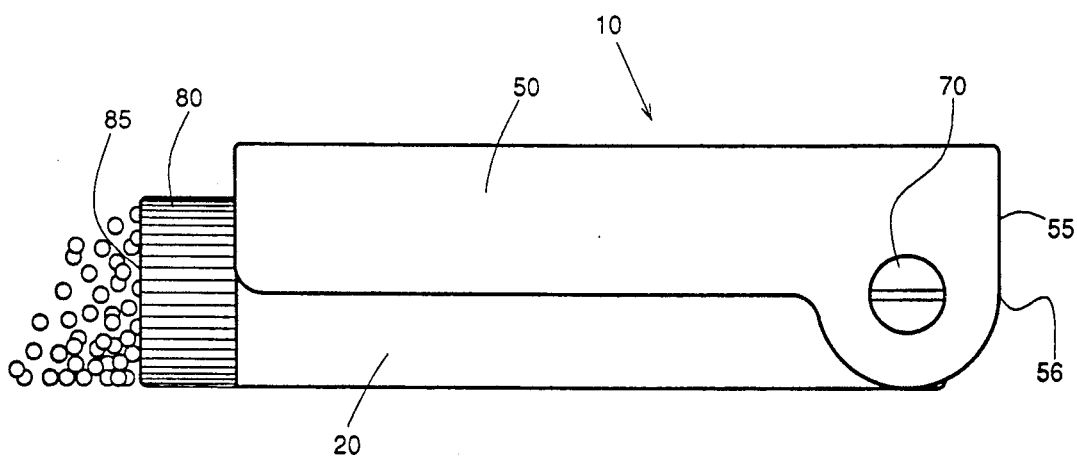
FIG. 6 is a side elevational view of the food press of FIG. 1 in the closed position showing foodstuffs exiting the press.
Figure 7:
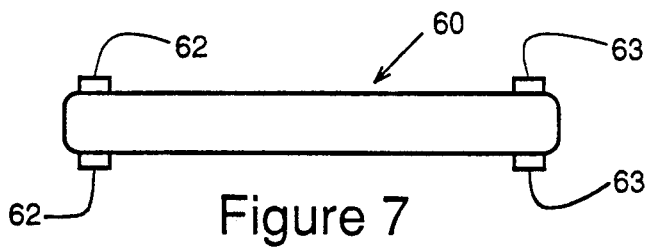
FIG. 7 is a top plan view of the connecting arm of the present invention.
Figure 8:
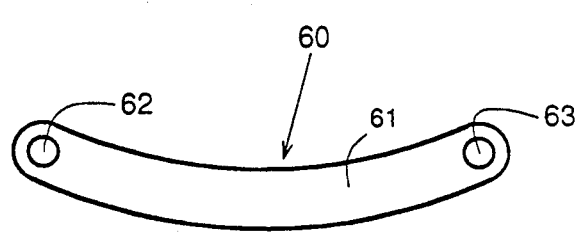
FIG. 8 is a side elevational view of the connecting arm of FIG. 7.
Figure 10:
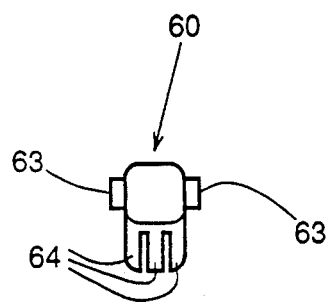
FIG. 10 is an end elevational view of the connecting arm of FIG. 7.

The handle 50 can rotate or pivot through about a 90 degree arc from an open position in FIG. 2 to a closed position overlying and generally parallel to the body 21 as shown in FIG. 6. The length of the handle 50 preferably is about the same as the length of the body 21.

The rear or bottom end 55 of the handle 50 includes a stop 56 which cooperates with the terminal end 25 on the body 21 to limit the opening movement of the handle 50 to the substantially 90 degree arc, and a pair of bores 57 which extend therethrough for the rotatable connection of the handle 50 to the rear end 25 of the body 20.

In the illustrative embodiment, the body 21, the handle 50, and the cap 80 are injection molded in acrylonitrile-butadiene-styrene (ABS) or polycarbonate plastic material.

FIGS. 7, 8, 9 and 10 illustrate the linking or connecting arm 60 of the preferred embodiment. As shown, the linking arm 60 has an elongated body 61 of substantially greater length than breadth. Preferably the arm 60 is slightly curved along its length with a curvilinear concave configuration to allow for clearance between the arm 60 and the top wall of the piston 40 when the piston 40 is in the full rearward position shown in FIG. 2. Correspondingly, the slot 36 in the body 21 allows for the movement of the arm 60 and struts 58 into the body 21 when the piston 40 is moved to its full forward position against the interior surface 30 of the perforated flat front wall 85 (FIG. 3).

Each end of the connecting arm 60 includes a pair of tabs 62 and 63, which extend outwardly from the arm 60 in a lateral direction. The tabs 62 pivotally snap-fit into the struts 45 of the piston 40 and the tabs 63 pivotally snap-fit into the struts 58 of the handle 50.

The linking arm 60 is symmetrical about its vertical axis so that the described snap-fit installation of the arm 60 to the piston 40 and handle 50 can be horizontally reversed to facilitate ease of assembly.

Figure 9:
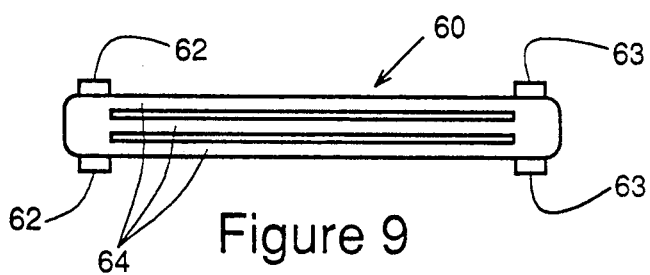
FIG. 9 is a bottom plan view of the connecting arm of FIG. 7.

In FIG. 9, it can be seen that the underside of linking arm 60 has one or more relieved areas that result in two or more vertical walls 64. These vertical walls 64 provide adequate strength while the relieved areas therebetween eliminate excess material and allow the part to be more easily manufactured by the preferred method. The tabs 62 and 63 can be integrally molded with the balance of the linking arm 60 or can be frictionally fitted through corresponding openings in the linking arm 60. The linking arm 60 is symmetrical about its vertical centerline and can therefore have its tabs 62 and 63 press-fit into the pair of struts 45 within the piston 40 and into the pair of struts 58 within the handle 50 in either direction to facilitate ease of assembly.

Figure 11:
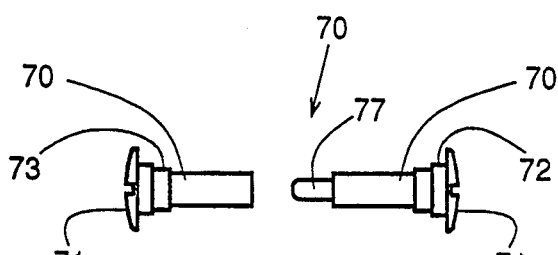
FIG. 11 is a side elevational view of the shaft of FIG. 1.
Figure 12:
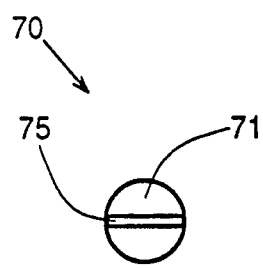
FIG. 12 is a front elevational view of the shaft of FIG. 11.

FIGS. 11 and 12 show a cap 71 which contains a slot 75 and which lies outside the exterior surfaces of the handle 50, a first step-down projection 72 which aligns with the pair of bores 57 in the handle 50, a second step-down projection 73 which aligns with the opposing bores 26 in the base 20, a threaded shaft 77 which lies within the piston chamber 35 proximate the rear end 25 of the elongated body 21 of the base 20. As best seen in FIG. 1, the shaft 70 serves when connected as the axle to rotatably connect the handle 50 to the base 20. FIGS. 11 and 12 show an embodiment preferably in injection molded plastics material the halves of which connect after passing through the handle 50 and the base 20 by press-fitting, ultrasonic welding, gluing, threading, or other suitable means, or in the case of a metallic shaft 70 by screw threading or other suitable means.

The reduced diameter portion of the shaft 70 is equal in length to the interior diameter of the piston chamber 35 within the base 20. This assures that when the two halves of the shaft 70 are tightly assembled one to the other, that the shaft 70 will not deflect or compress the shape of the handles 50 or the base 20 through which it passes.

As for every action there is an equal and opposite reaction, the forces exerted against the closed front wall 42 of the piston 40 during the crushing cycle will be concentrated, by way of the tabs 62 and 63 on the linking arm 60 and the pair of bores 57 in the handle 50, to the much smaller surface area of the step-down projections 72 and 73 of the shaft 70 and ultimately to the surfaces of the opposing bores 26 in the base 20. This condition predicates that the shaft 70 have as large a surface area as possible, particularly on the step-down projections 72 and 73, to spread the resultant forces over as large a surface area as possible to prevent wear and/or ultimate failure of the shaft 70.

The caps 71 both contain, in the case of a threaded part, slots 75 that are of sufficient width to accommodate a one-cent coin to allow convenient separation of the two halves of the shaft 70 by consumers.

The components of the press 10 preferably snap-fit together without the need of tools for assembly and without the need for metallic parts which can rust or corrode.

In operation, FIGS. 1 and 2 show the press 10 in its open position ready for the insertion of garlic cloves or other foodstuffs into the loading chamber 31 and in front of the piston 40. As the handle 50 is rotatably advanced forward by moving its upper free end 76, the connecting arm 60 is also caused to move forward, in turn, causing the piston 40 to slide forward in the body 21 and contact the foodstuffs in the loading chamber 31. As the piston 40 slides forward in its linear path, the foodstuffs are advanced, moving from the loading chamber 31 into the crushing chamber 29, until the foodstuffs are compressed between the piston 40 and the inner surface 30 of the perforated wall 85 of the cap 80. Additional advancement of the handle 50 will apply sufficient pressure to the foodstuffs to cause the foodstuffs to be pressed out of the openings or perforations 24 in the perforated wall 85 of the cap 80 in the form of juice, mash, etc.

FIGS. 2 and 3 show the piston 40 in its rearward most position and in its forward most position, respectively. The distance between the flat frontal surface 43 of the piston 40 while in the rear most position and the rear wall 48 of the piston 40 while in the forward most position can be considered the zone described as the loading chamber 31.

In the illustrative embodiment, advancing the handle 50 through its arc of rotation in equal increments, causes the piston 40 to advance in its linear path in unequal and generally decreasing increments.

With the press of the present invention relatively high pressures are provided when needed while providing quick advancement and retraction of the piston 40 when desired.

Relatively minimal or short linear movement of the piston 40 is provided to optimize pressure when crushing occurs in forcing foodstuffs through the perforations 24. In the present invention, equal incremental rotation of the advancing handle and corresponding arcuate distances result in a shorter and shorter advancement of the piston 40 thereby to provide a desirable increase in mechanical advantages and pressures as needed.

At the same time, the relationship of the rotation of the handle 50 and the linear movement of the piston 40 produce maximum linear movement of the piston 40 as needed. After inserting foodstuffs in the loading chamber 31, the free end 76 of the handle 50 is rotated in a counterclockwise arcuate manner. The initial stages of rotational movement of the handle 50 downwardly causes the maximum linear movement of the piston 40 to quickly advance the foodstuffs and piston 40 into the crushing chamber 20 for crushing. Then, after crushing the foodstuffs, the free end 76 of the handle 50 is rotated in a clockwise arcuate manner. The final stages of rotational movement of the handle 50 upwardly cause the maximum linear movement of the piston 40 to quickly retract the piston 40 past the loading chamber 31 to expedite the reloading of the press 10 for the next crushing operation.

For example, the first 45° of forward or downward rotation of the handle 50 advances the piston 40 twice as far as the last half of the crushing cycle. Correspondingly, the last 45° of rearward or upward rotation of the handle 50 retracts the piston 40 twice as far as the first half of the reloading cycle.

This represents additional efficiencies of the press of the present invention.

The press 10 preferably is hand holdable in use and readily can dispense pressed virgin foodstuffs from a variety of positions as needed into bowls, on food, etc. At the same time, the press 10 can dispense foodstuffs while resting on a surface such as a kitchen counter-top.

When the press 10 is held by hand during dispensing, it may be convenient to operate the press 10 with just one hand or, one hand can hold the bottom of the base 20 and the other hand can rotate the handle 50.

The press 10 has been so configured to operate effectively on a horizontal surface such as a kitchen countertop. In this use environment, edges 52a (FIGS. 4–6) of both depending side walls 52 that terminate radially from the center of the pair of bores 57 of the handle 50, continuously contact the counter-top surface during the full arcuate rotation of the handle 50 to prevent the press 10 from rotating laterally.

General cleaning of the press 10 may be accomplished by submerging the cap 80 and forward end 23 in soapy water and cycling the piston 40 several times in rapid succession. This method is particularly suitable for cleaning foodstuffs low in natural oil content where the reciprocating pumping action by the piston 40 around the peripheral wall 32 and throughout the crushing chamber 29 create an alternating pressure and vacuum which flush out residue lodged in or directly behind the perforated cap 80. Thorough cleaning of the press 10 may be accomplished by retraction of the piston 40, use of an appropriate sized prong device 90, and removal of the perforated cap 80 to expose all surfaces that may have contacted foodstuffs to hot soapy water as can be found in an automatic dishwasher. In this instance the cap 80 can be cleaned separate and apart from the balance of the press 10.

Figure 13:
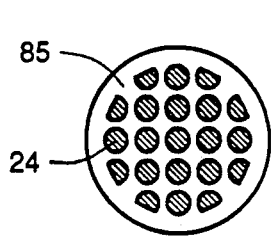
FIG. 13 is a front elevational view of another embodiment of a removable plastic cap of the invention with larger perforated openings.
Figure 15:
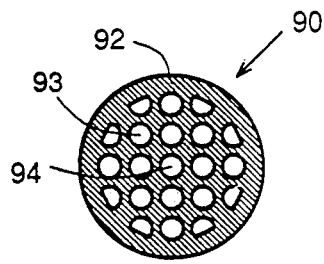
FIG. 15 is a front elevational view of a multi-pronged device for the cap of FIGS. 13 and 14.
Figure 16:
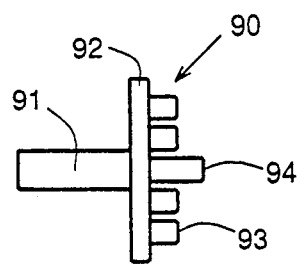
FIG. 16 is a side elevational view of a multi-pronged device of FIG. 15.

FIG. 15 is a front elevational view of one embodiment of a multi-pronged device 90. FIG. 16 is a side elevational view of the same embodiment of a multi-pronged device 90. As best seen in FIG. 16, the cylindrical handle 91 extends from the rear of the plate 92 and from the other side of which prongs 93 and 94 extend. FIGS. 15 and 16 show the prongs 93 and 94 correspond in size, shape and location to the perforations 24 in a perforated cap 80 as best seen in FIG. 13. One or more alignment prongs 94 can extend further from the plate 92, for example a centrally located alignment prong 94, to allow partially inserting into a corresponding centrally located perforation 24 in the perforated cap 80 such that basic registration between the two parts 80 and 90 can be established. The balance of the prongs 93 can then be more easily registered to align with their corresponding perforations 24 by rotating the multi-pronged device 90 to one of four increments after partially engaging the centrally located alignment prong 94 until the balance of the prongs 93 align with their corresponding perforations 24.

The alignment prong 94 has been illustrated in FIG. 16 but is applicable to any embodiment.

Figure 14:
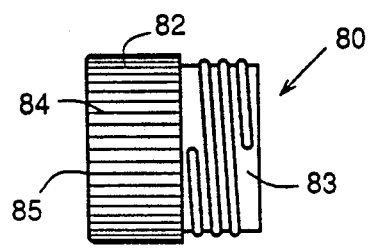
FIG. 14 is a side elevational view of the cap of FIG. 13.

Both the multi-pronged device 90 of FIGS. 15 and 16 and the perforated front cap 80 of FIGS. 13 and 14 have prongs 93 and perforations 24 that correspond in size, shape and location except that the prongs 93 are slightly smaller than are the perforations 24 such that the prongs 93 can be inserted into the openings 24 to clear out any dried or remaining foodstuffs after use of the garlic press 10.

FIG. 13 is a front elevational view of an embodiment of a perforated front cap 80 showing fewer and larger openings 24. FIG. 14 is a side elevational view of the same embodiment of a perforated front cap 80.

Figure 17:
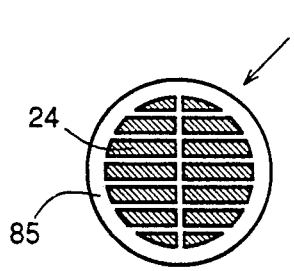
FIG. 17 is a front elevational view of another removable cap of the invention with female terminal threads and internal slicing edges.
Figure 18:
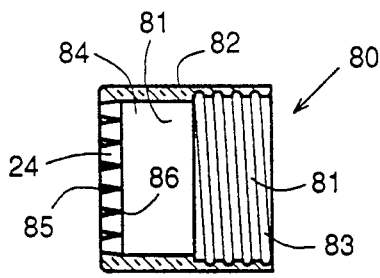
FIG. 18 is a side section view of the cap of FIG. 17.

FIG. 17 is a front elevational view of another embodiment of a perforated front cap 80. FIG. 18 is a side section view of the same embodiment of a perforated front cap 80. In FIG. 17, the perforations 24 of the perforated front cap 80 are basically rectangular in shape and the web of preferably injection molded plastics material that separates each perforation 24 is triangular in cross-section such that only sharp slicing edges 86 form the inner vertical surface 30 and face the crushing chamber 29 and serve to separate into slices the foodstuffs being forced through the perforations 24 by the piston 40 during operation of the garlic press 10.

Figure 19:
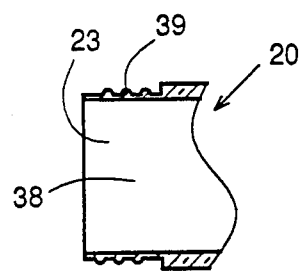
FIG. 19 is a partial side section view of the body of the invention with male terminal threads.

FIG. 19 is a partial side section view of the corresponding forward end 23 of the elongated body 21 of the base 20. In FIGS. 18 and 19 it can be seen that the interfacing threads of the rearward end 83 of the perforated front cap 80 and the forward end 23 of the base 20 have been reversed with the male threads being on the forward end 23 of the base 20 and the female threads on the inner circumferential surface 81 within the perforated front cap 80.

The reversal of the male and female threads has been illustrated in FIGS. 18 and 19, however is applicable to any embodiment.

Figure 20:
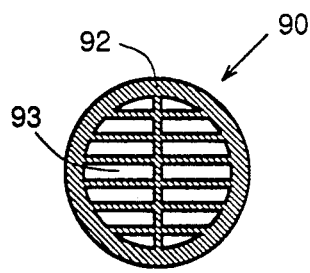
FIG. 20 is a front elevational view of a multi-pronged device of the invention for the cap of FIG. 17.
Figure 21:
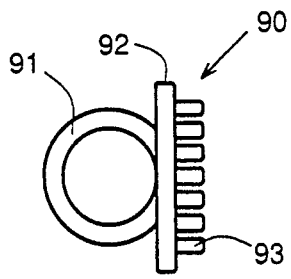
FIG. 21 is a side elevational view of the multi-pronged device of FIG. 20.

FIG. 20 is a front elevational view of another embodiment of the multi-pronged device 90. FIG. 21 is a side elevational view of the same embodiment of the multi-pronged device. FIG. 21 shows an open handle 91 that differs in configuration from the cylindrical handle 91 of FIG. 16 and extends rearward from the plate 92. The prongs 93 extend forward from the plate 92 and generally correspond in size, shape and location with the perforations 24 in the perforated front cap 80 shown in FIG. 17.

Figure 22:
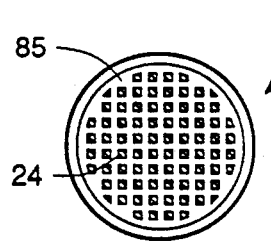
FIG. 22 is a front elevational view of a removable metal cap of the invention with female threads and smaller perforated openings.
Figure 23:
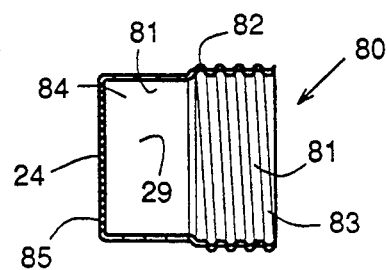
FIG. 23 is a side section view of the cap of FIG. 22.

FIG. 22 is a front elevational view of another embodiment of a perforated front cap 80. FIG. 23 is a side sectional view of the same embodiment of a perforated front cap 80. In FIG. 23, it can be seen that the wall thickness of the perforated front cap 80 is much thinner than previously illustrated. This thinness results from a preferred material change to a formed metal part. As a result, the female threads within the perforated front cap 80 can also be seen on the exterior of the part's rearward end 83.

Figure 24:
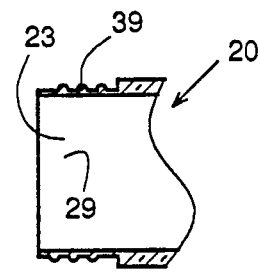
FIG. 24 is a partial side section view of the body of the invention with male terminal threads.

FIG. 24 is a partial side section view of the corresponding forward end 23 of the base 20. In this view, the corresponding male threads can be seen that engage with the metallic threads on the rearward end 83 of the perforated front cap 80 in FIG. 25. A common interior diameter is maintained at the interior intersection within both engaged parts such that the piston 40 can transcend the interior intersection without interruption.

In this embodiment the crushing chamber 29 is comprised of both the forward portion 84 of the cap 80 and the forward portion 23 of the base 20.

The mating of a metallic perforated front cap 80 with the forward end 23 of the elongated body 21 of the base 20 has been illustrated in FIGS. 23 and 24, however is applicable to any embodiment. Additionally this mating of differing materials can be combined with the reversal of male and female threads previously illustrated.

Figure 25:
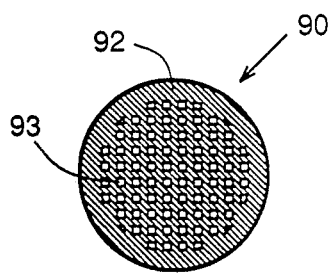
FIG. 25 is a front elevational view of still another multi-pronged device of the invention for the cap of FIG. 22.
Figure 26:
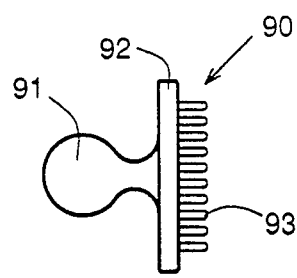
FIG. 26 is a side elevational view of the multi-pronged device of FIG. 25.

FIG. 25 is a front elevational view of another embodiment of a multi-pronged device 90. FIG. 26 is a side elevational view of the same embodiment of the multi-pronged device 90. These figures show smaller and more prongs 93 extending forward from the plate 92 and a ball shaped handle 91 extending rearward of the plate 92.

Illustratively, the press 10 can be about 5.75 inches in length and have a breadth of about 1.25 inches. In this embodiment, the piston has a breadth and length of about 1.0 inches with a clearance of about 0.004 inches between its outer periphery and inner peripheral wall 32 of the body 21 to provide a sliding fit therebetween. This clearance generally is less in total area than the total area of any one perforation 24 in the front end 85 so that foodstuffs will move through any one perforation and not blow-back about the periphery of the piston 40. Illustratively, there can be about 37 perforations in the end 85, each having a breadth of about 0.1 inches. Further, the loading chamber 31 and opening 33 can have a length of about 1.375 inches and the crushing chamber 29 can have a length of about 1.0 inches. Also, the arm 60 has a length of about 2.75 inches and is curved with a center-line radius of 3.3 inches. Correspondingly the handle 50 is 5.125 inches in length to allow ready access to the cap 80 for handling such or removal thereof. For ease of loading and holding increased amount of foodstuffs for each loading, the angle between the retracted handle 50 and connecting arm 60 is about 50°. At this angle, the forward travel of the piston 40 is increased to provide a larger loading chamber 31.

Within the scope of the present invention, moreover, the desired pressures can be achieved in a number of ways, including varying the surface area of the piston, the length of the handle (while maintaining convenient use and storage), the attachment point of the connecting arm to the handle and/or piston, the length of the connecting arm, the force applied to the handle, the attachment point of the handle to the body, the size and/or scale of component parts or in any combination of these or similar ways.

Although a preferred utility of the present invention is as a garlic press and its use has been highlighted for such use, the press of the present invention can be used for other pressable foodstuffs, such as vegetables, fruits, herbs, eggs, breads and pastas, and the like.

Thus, the invention in its broader aspects is not limited to the described embodiments and departures may be made therefrom within the scope of the accompanying claims without departing from the principles of the invention and without sacrificing its chief advantages.

What we claim is:

1. A food press, comprising:
   a body housing chamber means therein for receiving and pressing foodstuffs;
   a perforated member releasably secured to said body and adjacent said chamber means for pressing foodstuffs therethrough;
   a piston slidably fitted within said chamber means which linearly moves therein for moving and pressing the foodstuffs, wherein foodstuffs can be received by said chamber means when said piston is in one position within said chamber means and wherein said piston is adapted to press foodstuffs within said chamber means and through said perforations in said perforated member when said piston is in a second position within said chamber means;
   a rotatable handle operatively connected to said member; and
   linking means connected to said handle and to said piston, wherein when said handle is rotated in one direction said piston is moved to its one position and wherein said handle is rotated in the other direction said piston is moved to its second position in generally decreasing increments to thereby increase available piston force and pressure as foodstuffs are to be pressed through said perforations in said removable perforated member.

2. The food press of claim 1, wherein said perforated member is a removable cap.

3. The food press of claim 2, wherein said removable cap includes a perforated front wall and a skirt depending therefrom having threads thereon, and said body has corresponding threads thereon for releasably securing said cap thereto.

4. The food press of claim 3, wherein said cap has external threads on said depending skirt and said body has external threads thereon.

5. The food press of claim 2, wherein the food press includes a plurality of removable perforated caps, each being removably secured to said body, and wherein the perforation of each of said caps differ from one another.

6. A food press, comprising:
a removable member including a perforated front wall through which pressed foodstuffs can pass, a wall depending from said perforated front wall and including a crushing chamber within said wall adjacent said perforated front wall;
an elongated body including a forward end, a loading chamber for receiving foodstuffs and an opening into said loading chamber for feeding foodstuffs thereto;
coacting means on said member and said body for releasably securing said member thereto, and wherein said crushing chamber is adjacent to said loading chamber when said member is secured thereto;
a piston slidably fitted within said loading chamber and said crushing chamber of said member secured to said body, wherein said piston reciprocates therein for moving and pressing foodstuffs, and wherein said piston is adapted to be positioned in said body rearwardly of the foodstuffs in said loading chamber in its retracted position during and after foodstuffs are fed into the press and in said crushing chamber and against said forward end for pressing the foodstuffs through said perforations in its forward position;
a rotatable handle pivotally connected to said member rearwardly of said piston; and
linking means connected to said handle and to said piston, wherein said piston is adapted to move to its retracted position in said chamber means to allow said member to receive foodstuffs in said loading chamber when said handle is adapted to be moved to its forward position in said crushing chamber for pressing foodstuffs through said perforations when said handle is rotated in the other direction.

7. The food press of claim 6, wherein said coacting means are threads.

8. The food press of claim 7, wherein the threads on said removable member are external and wherein the threads on said body are internal.

9. The food press of claim 7, wherein the threads on said removable member are internal and wherein the threads on said removable member are internal.

10. The food press of claim 7, wherein there is essentially zero draft between the inner breadth of said crushing chamber within said removable member and said outer breadth of said piston.

11. The food press of claim 10, wherein said chambers are contiguous when said member is secured in said body and the inner surface of said chambers are continuous relative to one another.

12. The food press of claim 11, wherein said chambers are cylindrical in cross section.

13. The food press of claim 6, wherein said crushing chamber includes the crushing chamber in said removable member and a contiguous portion in said body wherein said member is secured thereto.

14. The food press of claim 6, wherein said press includes a plurality of said perforated members and wherein the perforations of each of said members differ from one another.

15. The food press of claim 6, wherein said perforated front wall includes openings therethrough partially defined by sharp edges adjacent said crushing chamber adapted to slice the foodstuffs as it is pressed through said openings.

16. The food press of claim 6, wherein said removable cap has indicia means thereon to indicate it is removable.

17. The food press of claim 14, wherein said indicia is observable irrespective of the position of said handle.

18. The food press of claim 1 or 6, further comprising a device having a plurality of prongs extending therefrom for extending through said perforations of said press for removing the residual foodstuffs from said perforations.

* * * * *